(12) United States Patent
Bucur

(10) Patent No.: US 6,864,669 B1
(45) Date of Patent: Mar. 8, 2005

(54) POWER SUPPLY BLOCK WITH SIMPLIFIED SWITCH CONFIGURATION

(75) Inventor: Constantin Bucur, Santa Clara, CA (US)

(73) Assignee: o2Micro International Limited, Grand Cayman (KY)

(*) Notice: Subject to any disclaimer, the term of this patent is extended or adjusted under 35 U.S.C. 154(b) by 20 days.

(21) Appl. No.: 10/428,505

(22) Filed: May 2, 2003

Related U.S. Application Data

(60) Provisional application No. 60/377,095, filed on May 2, 2002.

(51) Int. Cl.[7] ............................. G05F 1/40; H02J 3/32
(52) U.S. Cl. ........................................ 323/268; 307/48
(58) Field of Search ......................... 323/222, 268, 323/270, 271, 273; 307/43–46, 48, 49, 52, 66, 71, 75, 77, 80; 320/107, 127, 128, 135, 137

(56) References Cited

U.S. PATENT DOCUMENTS

| | | | | |
|---|---|---|---|---|
| 3,928,791 A | * | 12/1975 | Mullersman | 320/119 |
| 4,700,122 A | * | 10/1987 | Cimino et al. | 320/101 |
| 5,243,269 A | * | 9/1993 | Katayama et al. | 320/126 |
| 5,399,909 A | * | 3/1995 | Young | 307/65 |
| 5,523,669 A | * | 6/1996 | Oku et al. | 320/160 |
| 6,037,750 A | * | 3/2000 | Von Novak | 320/132 |
| 6,628,011 B2 | * | 9/2003 | Droppo et al. | 307/43 |
| 6,646,415 B1 | * | 11/2003 | Nebrigic et al. | 320/107 |

* cited by examiner

Primary Examiner—Matthew V. Nguyen
(74) Attorney, Agent, or Firm—Grossman, Tucker, Perreault & Pfleger PLLC

(57) ABSTRACT

A power supply block is configured to provide a power supply path from at least one power source to an associated system. The power supply block includes a power conversion element, e.g., a DC to DC converter, coupled to at least one battery and to a DC power source. The power conversion element includes a conductive path configured to provide a charge path from the DC power source to the at least one battery and a discharge path from the at least one battery to the associated system. As such, the number of switches in a power supply block can be reduced. In addition, a system capacitor size can also be reduced. An electronic device with at least one rechargeable battery utilizing such a power supply block is also provided.

23 Claims, 3 Drawing Sheets

POWER SUPPLY BLOCK WITH SIMPLIFIED SWITCH CONFIGURATION

CROSS REFERENCE TO RELATED APPLICATIONS

This application claims the benefit of the filing date of U.S. Provisional Application Ser. No. 60/377,095 filed May 2, 2002, the teachings of which are incorporated herein by reference.

FIELD OF THE INVENTION

This invention relates to power supply systems for electronic devices and more particularly to a power supply system having a power supply block with a reduced number of switches and having a reduced system capacitor size.

BACKGROUND OF THE INVENTION

Portable electronic devices such as laptop computers, cell phones, pagers, personal digital assistants, and the like are becoming more common in today's society as the capabilities and uses of such devices continues to expand. Many portable electronic devices are powered by a rechargeable battery, e.g., lithium, nickel-cadmium, or nickel-metal hydride type batteries, to facilitate the portable nature of such devices. Such portable electronic devices may also typically be powered by a DC power source when the situation permits, e.g., an AC/DC adapter plugged into a conventional AC outlet, which may also provide power to recharge the rechargeable battery.

Most portable electronic devices have an integral power supply block. The power supply block may contain a variety of circuits that provide a variety of power functions including coordination of power supply and delivery between a number of power sources, including enabling a battery to be recharged, without removing the battery from the portable electronic device.

As the efforts to extend operation time for portable electronic devices continues, some such devices may be equipped with two or more batteries. More sophisticated power supply blocks for use with an electronic device having two or more batteries may enable a user to use, remove, and/or insert any of the power sources, e.g., Battery A, Battery B, or an AC/DC adapter, without shutting down the portable electronic device.

A conventional power supply block that interfaces with two batteries and a DC power source may include anywhere between 12 to 16 switches, e.g., MOSFET transistors, and a large system capacitor, e.g., 100 pF, at the input to a DC/DC converter. Such a large number of switches and larger capacitor size increases price, uses valuable space on a PCB, slows down the high level integration of complex power supply blocks, and can decrease the mean time between failure (MTBF) which is a core measurement for portable electronic devices.

Accordingly, there is a need for a power supply block that overcomes the above deficiencies in the prior art by having less switches and a reduced system capacitor size.

BRIEF SUMMARY OF THE INVENTION

In one embodiment, a power supply block is configured to provide a power supply path from at least one power source to an associated system. The power supply block includes a power conversion element coupled to at least one battery and to a DC power source. The power conversion element includes a conductive path configured to provide a charge path from the DC power source to the at least one battery and a discharge path from the at least one battery to the associated system.

In another embodiment, an electronic device is provided. The electronic device includes a power supply block configured to provide a power supply path from at least one power source to system circuitry of the device. The power supply block includes a power conversion element coupled to at least one battery and to a DC power source. The power conversion element includes a conductive path configured to provide a charge path from the DC power source to the at least one battery and a discharge path from the at least one battery to the system circuitry.

In yet another embodiment consistent with the invention, a power supply block configured to provide a power supply path from at least one power source to an associated system is provided. The power supply block includes a DC to DC converter coupled to a first battery, a second battery, and to a DC power source. The DC to DC converter includes a conductive path configured to provide a charge path from the DC power source to the first battery and second battery during a charge mode and a discharge path from the first battery and second battery to the associated system during a discharge mode. The power supply block further includes a first switch coupled to the DC power source and the DC to DC converter; a second switch network coupled to the first battery and the DC to DC converter; a third switch network coupled to the second battery and the DC to DC converter; and a switch controller configured to control a conduction state of the first switch, the second switch network, and the third switch network in response to at least one input signal to the switch controller.

In yet another embodiment consistent with the invention, a method of reducing the number of switches in a power supply block is provided. The method includes: providing a charge path from a DC power source to at least one battery along a conductive path during a charge mode; and providing a discharge path from the at least one battery along the conductive path during a discharge mode.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
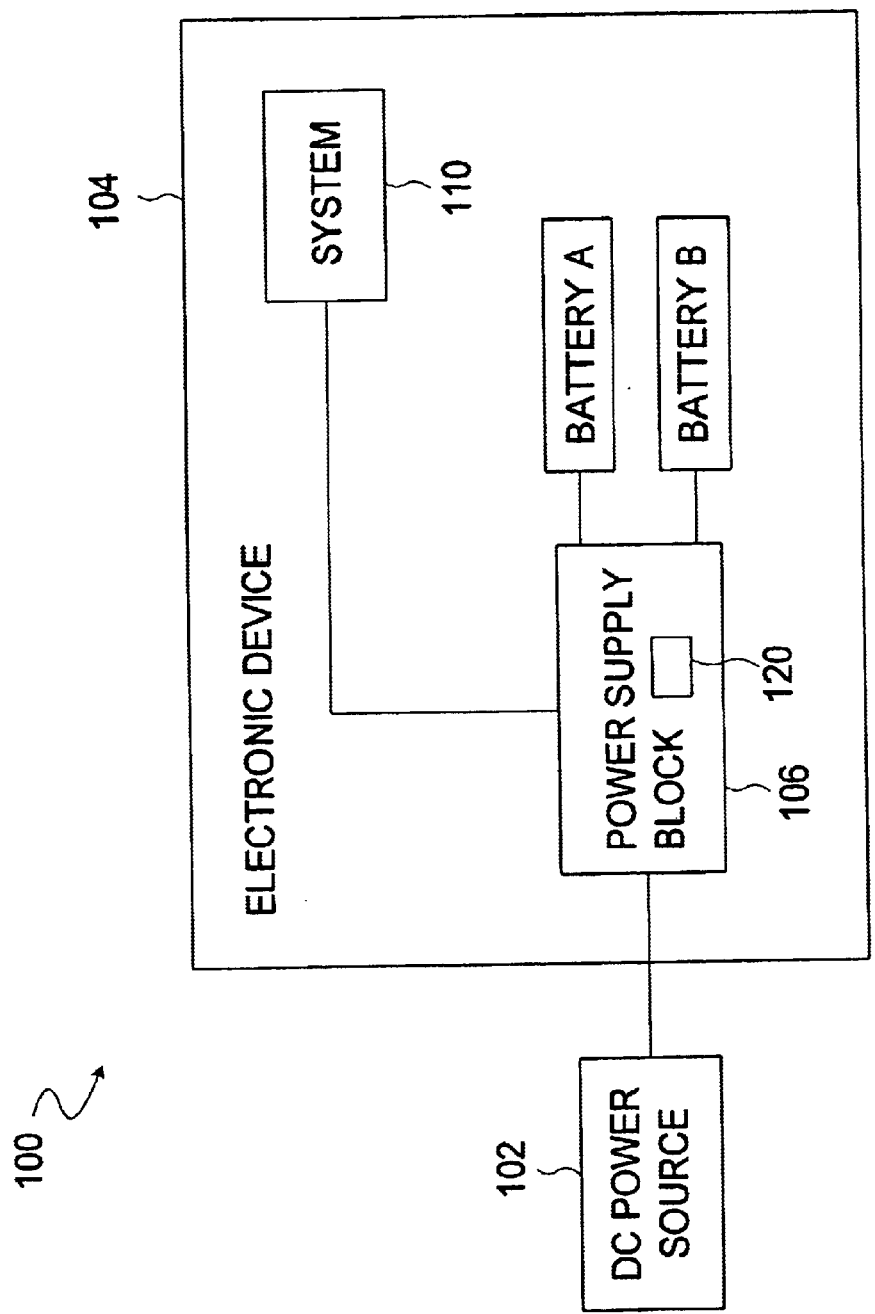
FIG. 1 is a block diagram of an exemplary electronic device having a power supply block consistent with the present invention.

Turning to FIG. 1, a simplified block diagram of an electronic device 104 and a DC power source 102 is illustrated. The electronic device 104 may be a portable device such as a laptop computer, cell phone, pager, personal digital assistant, and the like that includes a self contained power source such as a rechargeable battery (Battery A or Battery B), which facilitates the portable nature of such devices. The Batteries may be lithium, nickel-cadmium, nickel-metal hydride batteries, or the like. Although further description herein is with reference to two batteries, those skilled in the art will recognize that any number of batteries may be utilized.

If the electronic device 104 is a laptop computer it would include a variety of components known to those skilled in the art which are not illustrated in FIG. 1. For example, the laptop may include an input device for inputting data to the laptop, a central processing unit (CPU) or processor, for example a Pentium processor available from Intel Corporation, for executing instructions and controlling operation of the laptop, and an output device, e.g., a LCD or speakers, for outputting data from the laptop to name only a few.

To recharge the batteries and/or to supply power to the electronic device 104, a DC power source 102 may be coupled to the device 104. The DC power source 102 may be an AC/DC adapter which is configured to receive conventional AC voltage from an outlet and convert it to a DC output voltage. The DC power source 102 may also be a DC/DC adapter such as a "cigarette lighter" type adapter configured to plug into that type of socket. Such a power source 102 is illustrated in FIG. 1 as separate from the electronic device 104, but it may be built into some devices.

The electronic device 104 includes a power supply block 106. In general, the power supply block 106 may include various components to monitor, control, and direct power from each power source (DC power source 102, Batteries A and B) to each other and the system 110 of the device 104 under various conditions. One such component of the power supply block 106 includes a power conversion unit 120, e.g., a DC to DC converter that may be utilized to provide a charging current to Batteries A and B if a DC power source 102 of suitable characteristics is present. Advantageously, a power supply block 106 consistent with the invention includes a power conversion unit 120 having a conducting path providing as a charge path during a charge mode and providing a discharge path during a discharge mode as further detailed herein in order to reduce the number of switches on the power supply block 106.

Figure 2:
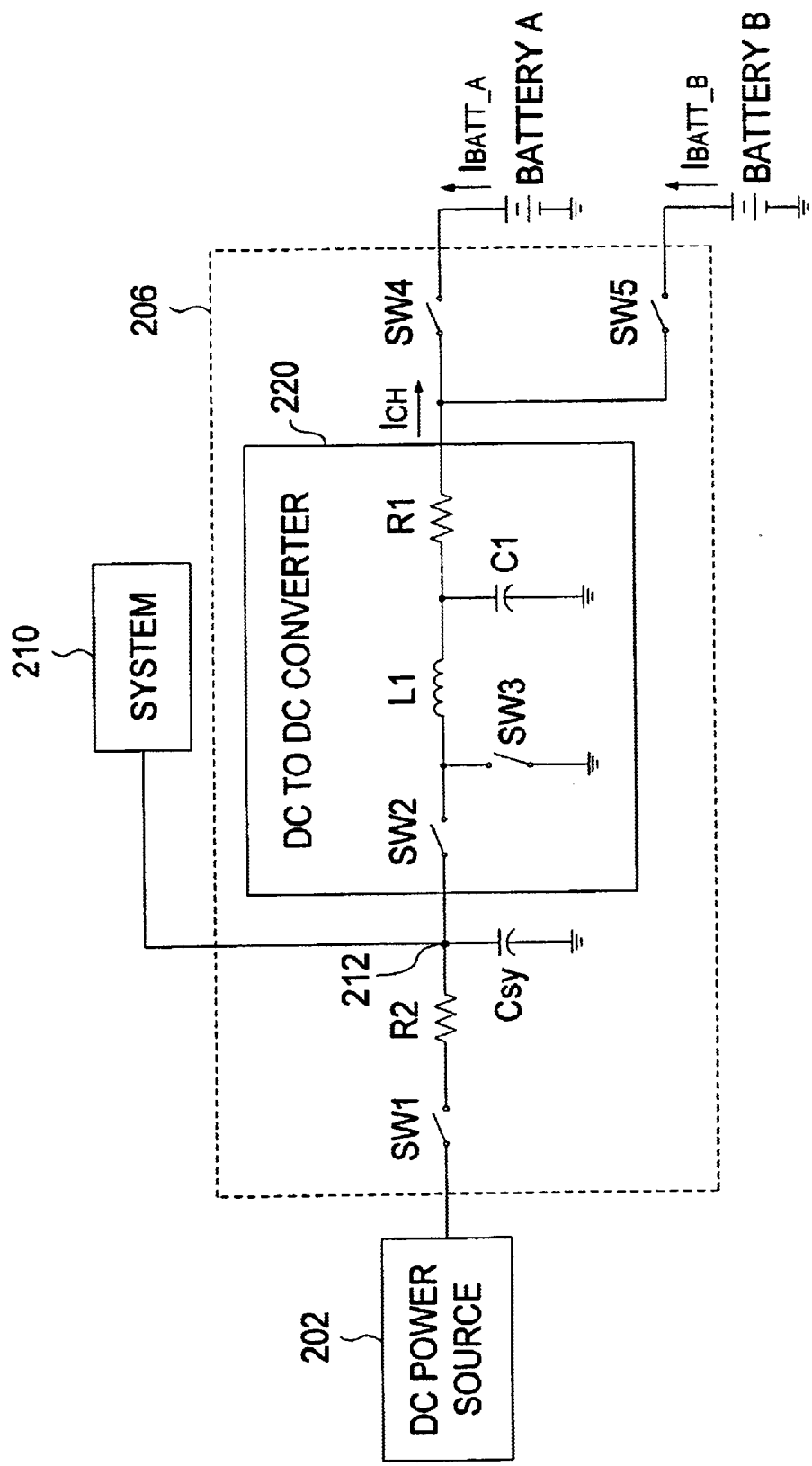
FIG. 2 is a more detailed block diagram of the power supply block of FIG. 1 consistent with the invention.

Turning to FIG. 2, an exemplary block diagram of a power supply block 206 consistent with the invention including a DC to DC converter 220 which, among other things, provides a conductive path from Batteries A and B to the system 210. The power supply block 206 includes switches SW1, SW4, and SW5 that couple the DC power source 202, Battery A, and Battery B respectively to various components. The power supply block 206 also includes a DC to DC converter 220 functioning as the power conversion unit.

In general, the power supply bock 206 operates to provide power to the system 210 from either the DC power source 202, Battery A, or Battery B, or some combination thereof. If a suitable DC power source 202 having acceptable power supply characteristics is present, switch SW1 will close to supply power from the DC power source 202 to the system 210. In addition, if it is determined that Battery A or Battery B or both requires charging in this instance, the DC to DC converter 220 will be enabled to provide a charging current IC H to one or more of the batteries in such a battery charge mode.

If a DC power source 202 having acceptable power supply characteristics is not present, switch SW1 is OFF and power may be supplied from one or more batteries A and B in a battery discharge mode. If power is to be supplied by Battery A, switch SW4 is ON and Battery A provides power to the system 210 via the DC to DC converter 220. Accordingly, switch SW2 of the DC to DC converter is ON and switch SW3 is OFF to enable the DC to DC converter 220 to provide a conductive path from Battery A to the system 210. As such, any additional switch or switches that may be utilized to couple Battery A to the system 210 is advantageously avoided in this instance. Therefore, switch SW4 provides a conductive path to Battery A in a battery charge mode and from Battery A in a battery discharge mode. Similarly, if power is to be supplied by Battery B, switch SW5 is ON and Battery B provides power to the system 210 via the DC to DC converter 220. The two Batteries A and B may also operate in parallel if the voltage level of each battery is within a predetermined voltage limit of one another.

In one exemplary embodiment, the DC to DC converter 220 may be a buck converter having a high side switch SW2, a low side switch SW3, LC filter having an inductor L1 and a capacitor C1, and a resistor R1. An associated controller controls the state of the high side switch SW2 and the low side switch SW3 such that the switches alternate between a "switch ON" and a "switch OFF" state as is known in the art. In a switch ON state, switch SW2 is ON and SW3 is OFF. In a switch OFF state, switch SW2 is OFF and SW3 is ON. As such, output voltage of the buck converter increases during the switch ON state and decreases during the switch OFF state. Switching is controlled to provide a desired output voltage and charging current to Battery A or B when the DC source is present and in a charging mode.

Figure 3:
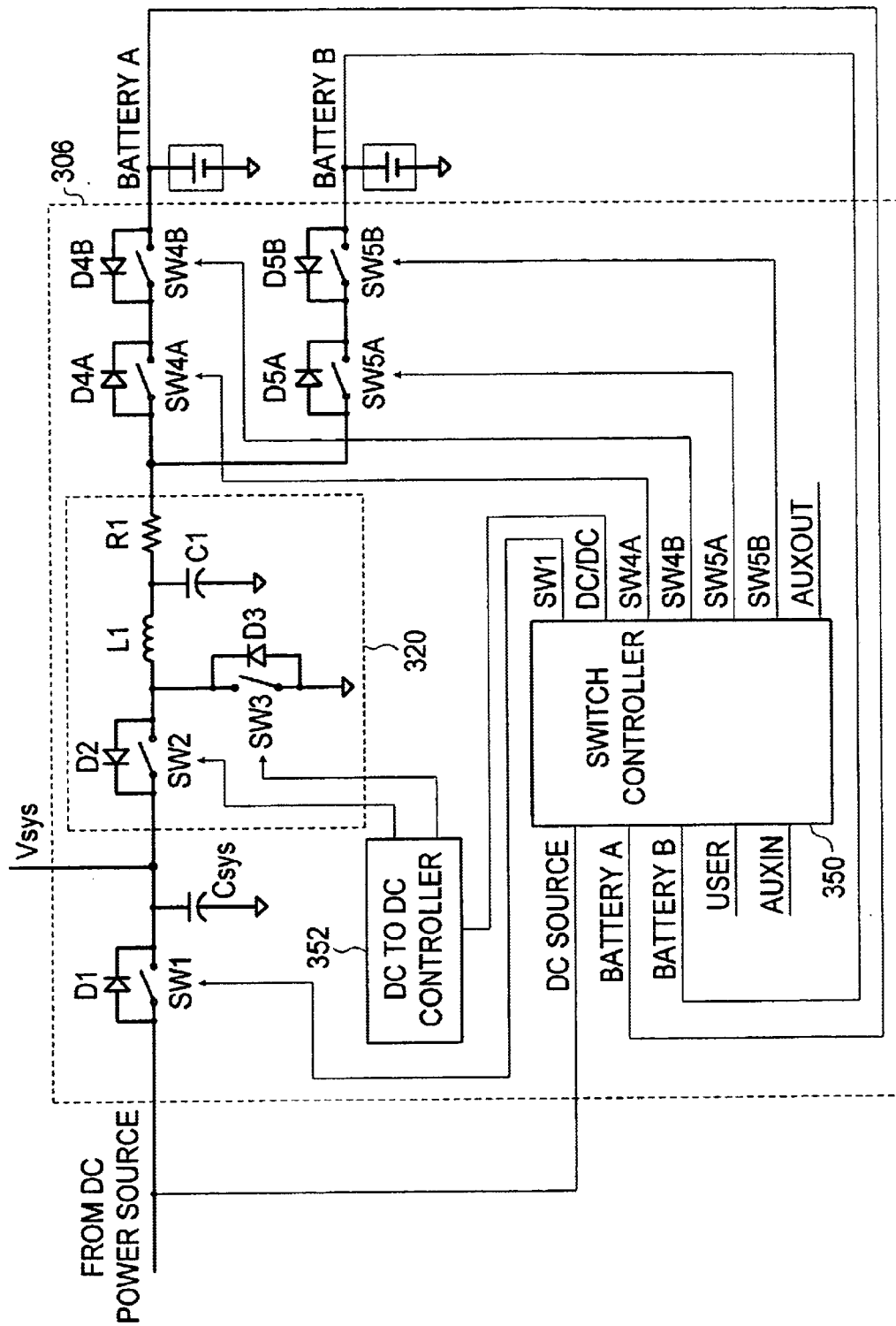
FIG. 3 is a block diagram of one exemplary embodiment of a power supply block consistent with the invention.

Turning to FIG. 3, a more detailed block diagram of an exemplary embodiment of a power supply block 306 consistent with the invention is illustrated. In general, the power supply block 306 may include switches SW1, SW4A, SW4B, SW5A, and SW5B, a DC to DC converter 320 having switches SW2 and SW3, a switch controller 350, and a DC to DC controller 352. Including the switches SW2 and SW3 of the DC to DC converter 320, only seven switches SW1, SW2, SW3, SW4A, SW4B, SW5A, and SW5B are necessary to provide the functionality of the switches SW1 to SW5 of FIG. 2. The switches SW1, SW2, SW3, SW4A, SW4B, SW5A, and SW5B may be any type of switches known in the art such as a transistors including any variety of transistors such as bipolar junction transistors, e.g., PNP and NPN, or field effect transistors such as MOSFETS, e.g., PMOS and NMOS. In addition, each switch SW1, SW2, SW3, SW4A, SW4B, SW5A, and SW5B may have an associated diode D1, D2, D3, D4A, D4B, D5A and D5B coupled in parallel with each respective switch. All switches SW1, SW2, SW3, SW4A, SW4B, SW5A, and SW5B normally dissipate less power than their corresponding parallel diodes D1, D2, D3, D4A, D4B, D5A, and D5B at similar current levels.

The switch controller 350 is configured to control the state of the switches SW1, SW4A, SW4B, SW5A, and SW5B and to provide a control signal to the DC to DC converter 352, which, in turn controls the state of the switches SW2 and SW3. The switch controller 350 may be any variety of circuits known to those skilled in the art. The switch controller 350 may be implemented in hardware or software. The switch controller 350 provides output control signals based on at least one input signal to various input terminals. These input terminals may include a DC source, Battery A, Battery B, User, and Auxin input terminals.

The DC source input terminal accepts an input signal representative of a condition, e.g., a voltage level, of the DC power source 202 at a particular time. The Battery A terminal accepts a feedback signal from Battery A representative of a condition, e.g., a voltage level, of Battery A. Similarly, the Battery B terminal accepts a feedback signal representative of a condition, e.g., voltage level, of Battery B. Although not shown, a sense impedance may be associated with both Batteries to generate the feedback signals.

A User input terminal allows a user of the associated electronic device to provide an input signal to the switch controller 350. Such a user input terminal permits programmability of various systems, e.g., battery discharge order. As such, the controller 350 may include an integrated SMBus for communication along a computer's SMBus when the electronic device is a computer. The Auxin input terminal represents a generic input terminal that may accept any other input control or data signals.

The SW1 output terminal of the switch controller 350 provides a switch control signal to switch SW1. The DC/DC output terminal provides a control signal to the DC to DC controller 352. The DC to DC controller 352 is responsive to this control signal to control the state of switches SW2 and SW3. The SW4A and SW4B output terminals provide respective switch control signals to switches SW4A and SW4B. Similarly, the SW5A and SW5B output terminals provide respective switch control signals to switches SW5A and SW5B. Finally, an Auxout terminal represents a generic output terminal that may output other control or data signals.

In operation, when a DC source with suitable supply characteristics is present the switch controller 350 receives an input signal at the DC source terminal representative of this condition. The switch controller 350 then provides a control signal to switch SW1 so SW1 is ON. As such, power is supplied to the system from the DC power source whenever it is present and has suitable supply characteristics. As such, battery power is conserved. Based on Battery A and Battery B input signals to the switch controller 350, the controller 350 determines if charging current should be supplied to Batteries A or B.

If Battery A is in need of charging, the switch controller instructs the DC to DC controller 352 to provide a charging current to Battery A. The DC to DC controller may be any variety of controller such as a pulse width modulation (PWM) controller. As is known in the art, a PWM controller varies the duty cycle of a control signal to the high side switch SW2 and low side switch SW3 to control the "switch ON" and "switch OFF" time intervals based on the duty cycle of the PWM control signal.

If this charging current is relatively low, the switch controller 350 provides switch control signals so switch SW4A is OFF and switch SW4B is ON. Such a relatively low charging current may be determined by comparing the charging current to a predetermined charging current level with a comparator. A charging current level less than the predetermined charging current would be treated as a relatively low charging current and a charging current greater than the predetermined charging current would be treated as a relatively high charging current.

With a relatively low charging current, charging current is provided to Battery A through diode D4A in parallel with open switch SW4A and through closed switch SW4B. Since the charging current is relatively low, its flow through diode D4A will produce negligible power dissipation. If the charging current is relatively high, the controller will turn both switches SW4A and SW4B ON. As such, no excess power is dissipated in diode D4A in this instance since the current flows through closed switch SW4A.

If Battery B is in need of charging, the switch controller 350 instructs the DC to DC controller 352 to provide a charging current to Battery B. Similar to Battery A, if this charging current is relatively low, the switch controller 350 will provide control signals so switch SW5A is OFF and switch SW5B is ON. If the charging current is relatively high, the switch controller 350 will turn both switches SW5A and SW5B ON.

When a suitable DC source is not present, the switch controller 350 receives an input signal at the DC source input terminal representative of this condition. In turn, the switch controller 350 instructs switch SW1 to be OFF. The system may then be powered by one or more of the Batteries A and B in a battery discharge mode. The switch controller 350 may receive an input signal, e.g. via the user terminal, representative of which Battery A or B to utilize. Alternatively, the switch controller 350 may also make a decision of which Battery to utilize based on the Battery A and Battery B feedback signals to the switch controller 350.

If Battery A is to be discharged, the switch controller 350 provides control signals so switch SW4A is ON and SW4B is OFF in one instance. As such, current from Battery A is provided through diode D4B, in parallel with open switch SW4B, and through closed switch SW4A to the DC to DC converter 320. This switch configuration mode typically occurs in emergency situations, e.g., power was being supplied by Battery B and Battery B was removed or power was being supplied by the DC power source and it was removed. In other instances, the switch controller 350 may instruct both switches SW4A and SW4B to be ON, e.g., this should occur under normal discharge conditions in order to provide maximum voltage with minimal power losses. In both instances, the switch controller 350 via the DC to DC controller 352 instructs switch SW2 to be ON and switch SW3 to be OFF to provide a discharge path to the system from Battery A through the DC to DC converter 320. Similarly, if Battery B is to be utilized, the switch controller 350 provides control signals so switch SW5A is ON and SW5B is OFF in one instance. Alternatively, the switch controller 350 may instruct both switches SW5A and SW5B to be ON, e.g., under normal Battery B discharge conditions.

The switch controller 350 may also instruct all switches to be in a diode switch mode. In this diode switch mode, the switch controller 350 instructs switch SW1 to be OFF, SW2 to be ON, switch SW3 to be OFF, switch SW4A to be ON, switch SW4B to be OFF, switch SW5A to be ON and switch SW5B to be OFF. A diode switch mode may occur if any one of the power sources, e.g., the DC power source, is inadvertently removed. As such, the power source with the highest voltage level (DC power source, Battery A, or Battery B) will supply power to the system through one of the diodes D1, D4B, or D5B respectively in this diode switch mode.

For instance, if the DC power source is removed the diode switch mode has switches SW4A ON, SW4B OFF, SW5A ON, and SW5B OFF such that power is supplied to the system by either Battery A or Battery B having the higher voltage level. The switch controller 350, e.g., based on feedback signals from Battery A and Battery B, then may decide between Battery A or Battery B powering the system. If Battery A is to power the system, the switch controller 350 may then instruct switches SW4A and SW4B to be ON. As such, excess power is not dissipated in diode D4B. In addition, the switch controller 350 would also instruct switches SW5A and SW5B to be OFF in this instance. If a DC power source later becomes available, the switch controller 350 would sense this condition via the DC power source input terminal and instruct switch SW1 to be ON. As such, the DC power source would then power the system and the switch controller 350 would wait for a proper "charge" command to begin charging either Battery A or Battery B.

As such, a power supply block 306 consistent with the invention may use a natural switching method as diode bridge mode when a power source is removed and after that the system is taken over through a state-machine, e.g., the switch controller 350. The state-machine may be implemented in an integrated circuit (IC) or in a mnicroprocessor. Actually, this problem typically only appears when the DC power source is removed, otherwise the power supply block switches are under control of the switch controller 350. In one embodiment, the switch controller 350 may be a mixed mode IC capable of performing accurate and fast analog comparisons and include a fast digital state-machine to control switching.

In addition, a power supply block 306 consistent with the invention permits the value of the system capacitor Csys to be greatly reduced by a factor of 5 to 10 over other known power supply blocks for use with two batteries. For instance, an otherwise typical system capacitor value of 100 $\mu$F may be reduced to between about 10 $\mu$F and 22 $\mu$F by having a diode like transition between the DC power source and the Batteries A and B as earlier described.

In addition, a full range of programming may be allowed through the User input terminal of the switch controller 350, e.g., via a System Management Bus (SMBus) protocol. For example, a system designer could choose different charging or discharging algorithms for different types of portable electronic devices and/or batteries. This may include charging current/voltage, multiple levels of safety features, hot swap or suspend, different low power modes depending on external conditions, all without losing control of the electronic device. Those skilled in the art will recognize that there are many more advantages of an SMBus controlled power system.

It will be appreciated that the functionality described for the embodiments of the switch controller consistent with the invention may also be implemented using software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A power supply block configured to provide a power supply path form at least one power source to an associated system, said power supply block comprising:
    a power conversion element coupled to at least one battery and to a DC power source, said power conversion element comprising a conductive path said conductive path configured to provide a charge path from said DC power source to said at least one battery and a discharge path from said at least one battery to said associated system wherein said at least one battery comprises a first battery and a second battery;
    a first switch coupled to said DC power source and said power conversion element;
    a second switch coupled to said first battery and said power conversion element a third switch coupled to said second battery and said power conversion element; and
    a switch controller configured to control a conduction state of said first switch, said second switch, and said third switch in response to at least one input signal to said switch controller.

2. The power supply block of claim 1, wherein said at least one input signal is representative of a condition of said DC power source.

3. The power supply block of claim 1, wherein said at least one input signal is representative of a condition of said fixed battery.

4. The power supply block of claim 3, wherein said condition comprises a voltage level of said first battery.

5. The power supply block of claim 1, wherein said at least one input signal is representative of a condition of said second battery.

6. The power supply block of claim 5, wherein said condition comprises a voltage level of said second battery.

7. The power supply block of claim 1, wherein said at least one input signal is representative of a user command.

8. The power supply block of claim 1, wherein said power conversion element comprises a DC to DC buck converter having a high side switch and low side switch, and said power supply block further comprises a DC to DC controller responsive to an output signal from said switch controller to control said high side switch and said low side switch so that said high side switch is closed and said low side switch is open to provide said discharge path.

9. The power supply block of claim 8, wherein said DC to DC controller comprises a PWM controller.

10. The power supply block of claim 1, wherein a node is coupled to said power conversion element and said DC power source, and wherein said power supply block fir comprises a system capacitor coupled to said node, said system capacitor hag a predetermined size less than or equal to 22 $\mu$F.

11. An electric device comprising:
    a power supply block configured to provide a power supply path from at least one power source to system circuitry of said electronic device wherein said power supply block comprises:
        a power conversion element coupled to at last one battery and to a DC power source, said power conversion element comprising a conductive path, said conductive path configured to provide a chase path from said DC power source to said at least one battery and a discharge path from said at least one battery to said system circuitry,
    wherein said at least one battery comprises a first battery and a second battery,
    a first switch coupled to said DC power source and said power conversion element;
    a second switch coupled to said first battery and said power conversion element;
    a third switch coupled to said second battery and said power conversion element; and
    a switch controller configured to control a conduction state of said first switch said second switch, and said third switch in response to at least one input signal to said switch controller.

12. The electronic device of claim 11, wherein said at least one input signal is representative of a condition of said DC power source.

13. The electronic device of claim 11, wherein said at least one input signal is representative of a condition of said first batter.

14. The electronic device of claim 13, wherein said condition comprises a voltage level of said first battery.

15. The electronic device of claim 11, wherein said at least one input signal is representative of a condition of said second battery.

16. The electronic device of claim 15, wherein said condition comprises a voltage level of said second battery.

17. The electronic device of claim 11, wherein said at least one input signal is representative of a user command.

18. The electronic device of claim 11, wherein said power conversion element comprises a DC to DC buck converter having a high side switch and low side switch, and said power supply block further comprises a DC to DC controller responsive to an output signal from said switch controller to control said high side switch and said low side switch.

19. The electronic device of claim 18, wherein said DC to DC controller comprises a PWM controller.

20. The electronic device of claim 11, wherein a node is coupled to said power conversion element and said DC power source, and wherein said power supply block further comprises a system capacitor coupled to said node, said system capacitor having a predetermined size less than or equal to 22 $\mu$F.

21. A power supply block configured to provide a power supply path from at least one power source to an associated system, said power supply block comprising:

a DC to DC converter coupled to a first battery, a second battery, and to a DC power source, said DC to DC converter comprising a conductive path, said conductive path configured to provide a charge path firm said DC power source to said first battery and second battery during a charge mode and a discharge path from said first battery and second battery to said associated system during a discharge mode;

a first switch coupled to said DC power source and said DC to DC converter, a second switch network coupled to said first battery and said DC to DC converter;

a third switch network coupled to said second battery and said DC to DC converter, and a switch controller configured to control a conduction state of said East switch, said second switch network and said third switch network in response to at least one input signal to said switch controller.

22. The power supply block of claim 21, wherein said second switch network comprises a second switch and a third switch, wherein a first diode is coupled in parallel with said second switch and is configured to permit current flow towards said first battery from said DC source in said charge mode, and wherein a second diode is coupled in parallel with said third switch and is configured to permit current flow from said first battery to said associated system in said discharge mode.

23. The power supply block of claim 21, wherein said third switch network comprises a fourth switch and a fifth switch, wherein a third diode is coupled in parallel with said fourth switch and is configured to permit current flow towards said second battery from said DC source in said charge mode, and wherein a fourth diode is coupled in parallel with said fifth switch is configured to permit current flow from said second battery to said associated system in said discharge mode.

* * * * *

UNITED STATES PATENT AND TRADEMARK OFFICE
CERTIFICATE OF CORRECTION

PATENT NO. : 6,864,669 B1
DATED : March 8, 2005
INVENTOR(S) : Bucur

It is certified that error appears in the above-identified patent and that said Letters Patent is hereby corrected as shown below:

Column 7,
Line 62, delete the word "form" and insert the word -- from --;
Line 66, after the word "path", insert a comma -- , --;

Column 8,
Line 3, after the word "system", insert a comma -- , --;
Line 8, after the word "element", insert a semi-colon -- ; -- and start a new paragraph;
Line 20, delete the word "fixed" and insert the word -- first --;
Line 42, delete the word "fir" and insert the word -- further --;
Line 44, delete the word "hag" and insert the word -- having --;
Line 49, after the word "device", insert a comma -- , --;
Line 54, delete the word "chase" and insert the word -- charge --;
Line 67, after the first word "switch", add a comma -- , --;

Column 9,
Line 8, delete the word "batter" and insert the word -- battery --;

Column 10,
Line 2, delete the word "firm" and insert the word -- from --;
Lines 8 and 12, delete the comma "," and insert a semi-colon -- ; --;
Line 14, delete the word "East" and insert the word -- first --;
Line 14, after the word "network", insert a comma -- , --.

Signed and Sealed this

Twenty-seventh Day of September, 2005

JON W. DUDAS
*Director of the United States Patent and Trademark Office*